(12) United States Patent
Udaka

(10) Patent No.: US 9,744,953 B2
(45) Date of Patent: Aug. 29, 2017

(54) VEHICLE BRAKE CONTROL APPARATUS AND BRAKE CONTROL METHOD

(75) Inventor: Satoshi Udaka, Suntou-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/348,440

(22) PCT Filed: Sep. 10, 2012

(86) PCT No.: PCT/IB2012/001734
§ 371 (c)(1),
(2), (4) Date: Mar. 28, 2014

(87) PCT Pub. No.: WO2013/045987
PCT Pub. Date: Apr. 4, 2013

(65) Prior Publication Data
US 2014/0229086 A1    Aug. 14, 2014

(30) Foreign Application Priority Data
Sep. 29, 2011 (JP) .................. 2011-215252

(51) Int. Cl.
  *B60T 8/1761* (2006.01)
  *B60T 7/22* (2006.01)
  (Continued)

(52) U.S. Cl.
  CPC .............. *B60T 8/1761* (2013.01); *B60T 7/22* (2013.01); *B60T 8/1766* (2013.01);
  (Continued)

(58) Field of Classification Search
  CPC ........ B60T 7/12; B60T 7/22; B60T 2201/022; B60T 2210/32; B60T 8/176–8/17616; B60W 2520/263
  (Continued)

(56) References Cited

U.S. PATENT DOCUMENTS 5,752,752 A *   5/1998   Tozu et al. .................... 303/146
5,934,770 A *   8/1999   Okazaki ........................ 303/150
(Continued)

FOREIGN PATENT DOCUMENTS

JP      11-263208      9/1999
JP      11-263209      9/1999
(Continued)

OTHER PUBLICATIONS

Onuma et al., JP2002160623, Jun. 4, 2002 (Machine Translation).*
International Search Report issued Jun. 5, 2013, in PCT/IB12/001734 filed Sep. 10, 2012.

*Primary Examiner* — Courtney Heinle
(74) *Attorney, Agent, or Firm* — Oblon, McClelland, Maier & Neustadt, L.L.P.

(57) ABSTRACT

An ECU is formed of an ABS control device for controlling operation of a braking device when a slip ratio of wheels FR to RL becomes greater than a threshold, an automatic brake control device that controls operation of the braking device based on information on surroundings of the vehicle, and the threshold changing device that changes the threshold at which the braking device is activated by the ABS control device so that the threshold when the braking device is being operated by the automatic brake control device is smaller than the threshold when the braking device is not being operated by the automatic brake control device.

4 Claims, 3 Drawing Sheets

(51) Int. Cl.
*B60T 8/1755* (2006.01)
*B60T 8/1766* (2006.01)

(52) U.S. Cl.
CPC ...... *B60T 8/17558* (2013.01); *B60T 8/17616* (2013.01); *B60T 2201/022* (2013.01); *B60T 2210/32* (2013.01); *B60W 2520/263* (2013.01)

(58) Field of Classification Search
USPC .................................................... 701/70–98
See application file for complete search history.

(56) References Cited

U.S. PATENT DOCUMENTS

| | | | |
|---|---|---|---|
| 6,027,182 A * | 2/2000 | Nakanishi et al. | 303/116.1 |
| 6,223,115 B1 * | 4/2001 | Batistic | 701/72 |
| 6,246,947 B1 * | 6/2001 | Batistic | 701/72 |
| 6,289,272 B1 * | 9/2001 | Batistic et al. | 701/72 |
| 6,289,281 B1 * | 9/2001 | Shinmura et al. | 701/301 |
| 6,345,226 B1 * | 2/2002 | Koga et al. | 701/71 |
| 6,505,110 B1 * | 1/2003 | Yoshino | 701/71 |
| 8,224,546 B2 * | 7/2012 | Terasaka | 701/73 |
| 8,768,595 B2 * | 7/2014 | Ogawa et al. | 701/71 |
| 2004/0124701 A1 * | 7/2004 | Nihei et al. | 303/163 |
| 2005/0209762 A1 * | 9/2005 | Lu et al. | 701/70 |
| 2005/0246086 A1 * | 11/2005 | Motosugi et al. | 701/78 |
| 2007/0294019 A1 * | 12/2007 | Nishira et al. | 701/70 |
| 2008/0284243 A1 * | 11/2008 | Auer et al. | 303/115.2 |
| 2013/0297168 A1 * | 11/2013 | Svensson | 701/70 |
| 2014/0229086 A1 * | 8/2014 | Udaka | 701/75 |
| 2014/0336896 A1 * | 11/2014 | Udaka et al. | 701/70 |

FOREIGN PATENT DOCUMENTS

| | | |
|---|---|---|
| JP | 2001-138881 A | 5/2001 |
| JP | 2002-160621 A | 6/2002 |
| JP | 2002-160623 | 6/2002 |
| JP | 2005-162045 | 6/2005 |

* cited by examiner

VEHICLE BRAKE CONTROL APPARATUS AND BRAKE CONTROL METHOD

BACKGROUND OF THE INVENTION

1. Field of the Invention

This invention relates to a brake control apparatus and a brake control method for use in a vehicle.

2. Description of Related Art

An anti-lock brake system (ABS) has been proposed to suppress the locking of the wheels during braking of a vehicle, which is designed such that if locked wheels or slip is detected, control is performed to automatically relax the braking. In addition, an automatic braking system has also been proposed which is designed to brake a running vehicle independently of the driver's braking operation if required, for example when an obstacle is detected in front of the vehicle. Further, Japanese Patent Application Publication No. 2002-160623 (JP 2002-160623 A) describes a vehicle anti-skid control system, which changes the condition to start anti-skid control according to whether or not a brake force is applied to wheels by an automatic braking system. This system thereby prevents the control amount at the start of anti-skid control from being increased to cause drastic change in the brake force due to the fact that the anti-skid control is not started until brake slip becomes higher than when normal anti-skid control is started.

When an automatic braking system is used to brake a vehicle as necessary independently of the driver's braking operation, sufficient safety must be ensured for the driver. Therefore, the association in activation between an ABS and an automatic braking system must be improved more.

SUMMARY OF THE INVENTION

The invention has been made in view of the circumstances described above, and an object of the invention is to provide a vehicle brake control apparatus and brake control method capable of improving the safety by stabilizing a behavior of a vehicle during braking.

A vehicle brake control apparatus according to a first aspect of the invention includes: a first brake control device that operates a braking device based on information on surroundings of the vehicle; a second brake control device that operates the braking device when a slip ratio of wheels becomes greater than a threshold; and the threshold changing device that changes the threshold, at which the braking device is activated by the second brake control device, so that the threshold when the braking device is being operated by the first brake control device is smaller than the threshold when the braking device is not being operated by the first brake control device.

In the vehicle brake control apparatus according to the first aspect of the invention, the threshold changing device may change the threshold when a braking amount of the braking device determined by the first brake control device is greater than a braking amount of the braking device determined by an operation of a braking operation unit that is operated by a driver to brake the vehicle.

In the vehicle brake control apparatus according to the first aspect of the invention, the braking amount of the braking device determined by the first brake control device may be a brake force that is set based on the information on surroundings of the vehicle, and the braking amount of the braking device determined by the braking operation unit may be a operation amount or operating force of a brake pedal as the braking operation unit.

In the vehicle brake control apparatus according to the first aspect of the invention, the second brake control device may operate the braking device so as to suppress an increase of the slip ratio from increasing when the wheels are locked; and the threshold changing device may suppress the locking of the wheels by changing the threshold at which the braking device is activated by the second brake control device so that the threshold when the braking deice is being operated by the first brake control device is smaller than the threshold when the braking device is not being operated by the first brake control device.

A vehicle brake control method according to a second aspect of the invention includes: determining which one of a first braking amount of the braking device and a second braking amount of the braking device is greater than the other, depending on the operation state, wherein the first braking amount is determined based on the information on surroundings of the vehicle, the second braking amount is determined by a braking operation by driver; and setting, depending on a result of the determining which one of the amounts is greater than the other, a threshold for a slip ratio of wheels at which the braking device is activated.

The vehicle brake control apparatus and the brake control method according to the invention make it easy to trigger activation of the brake based on information on surroundings of the vehicle. Thus, the behavior of the vehicle can be stabilized even when the vehicle is braked without the driver's intention, and safety in traveling of the vehicle can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of a vehicle brake control apparatus according to the invention will be described with reference to the drawings. The invention is not limited to this embodiment, and may be embodied in several forms. This invention includes a combination of these embodiments.

Figure 1:
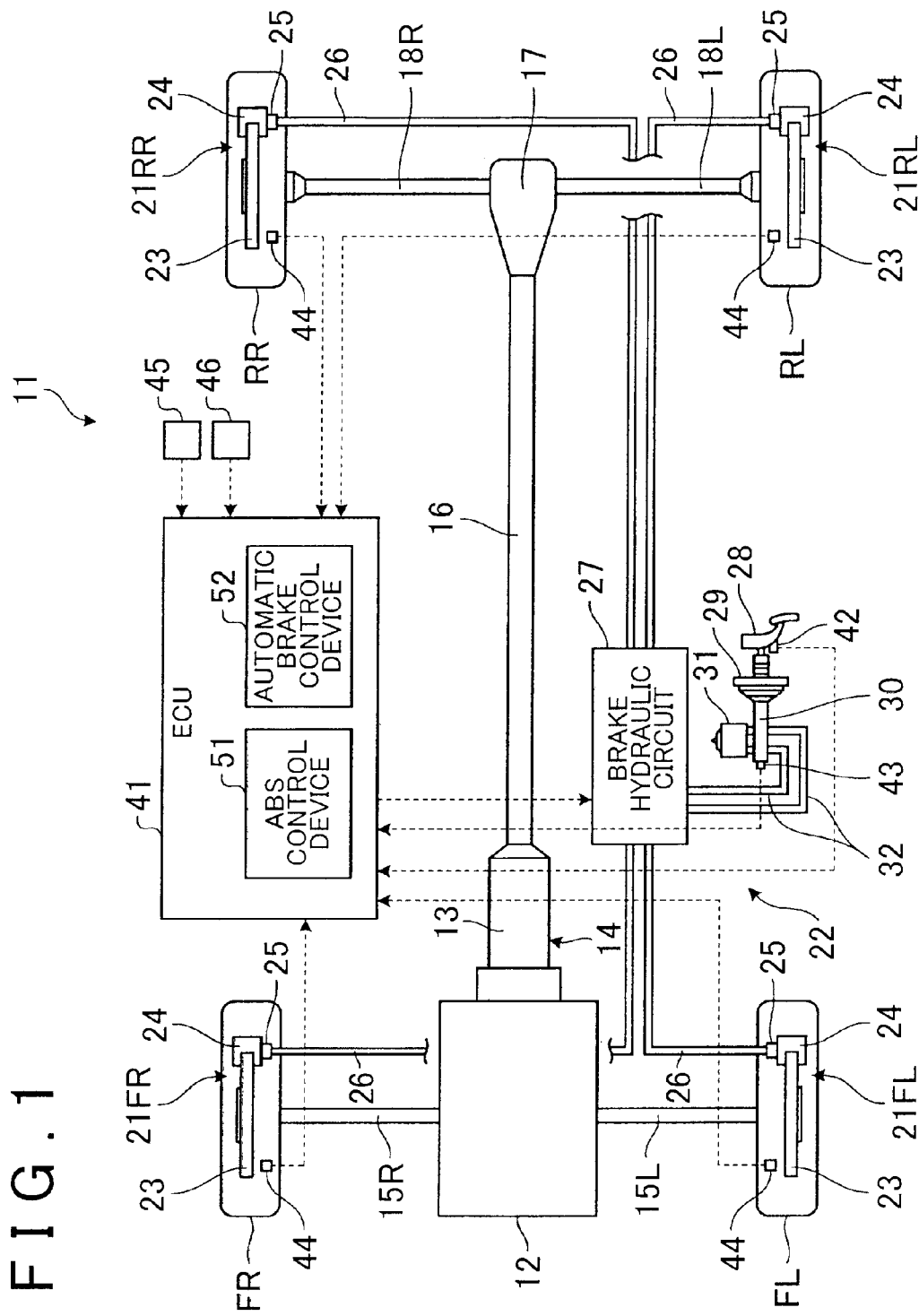
FIG. 1 is a configuration diagram schematically showing a vehicle brake control apparatus according to an embodiment of the invention.
Figure 2:
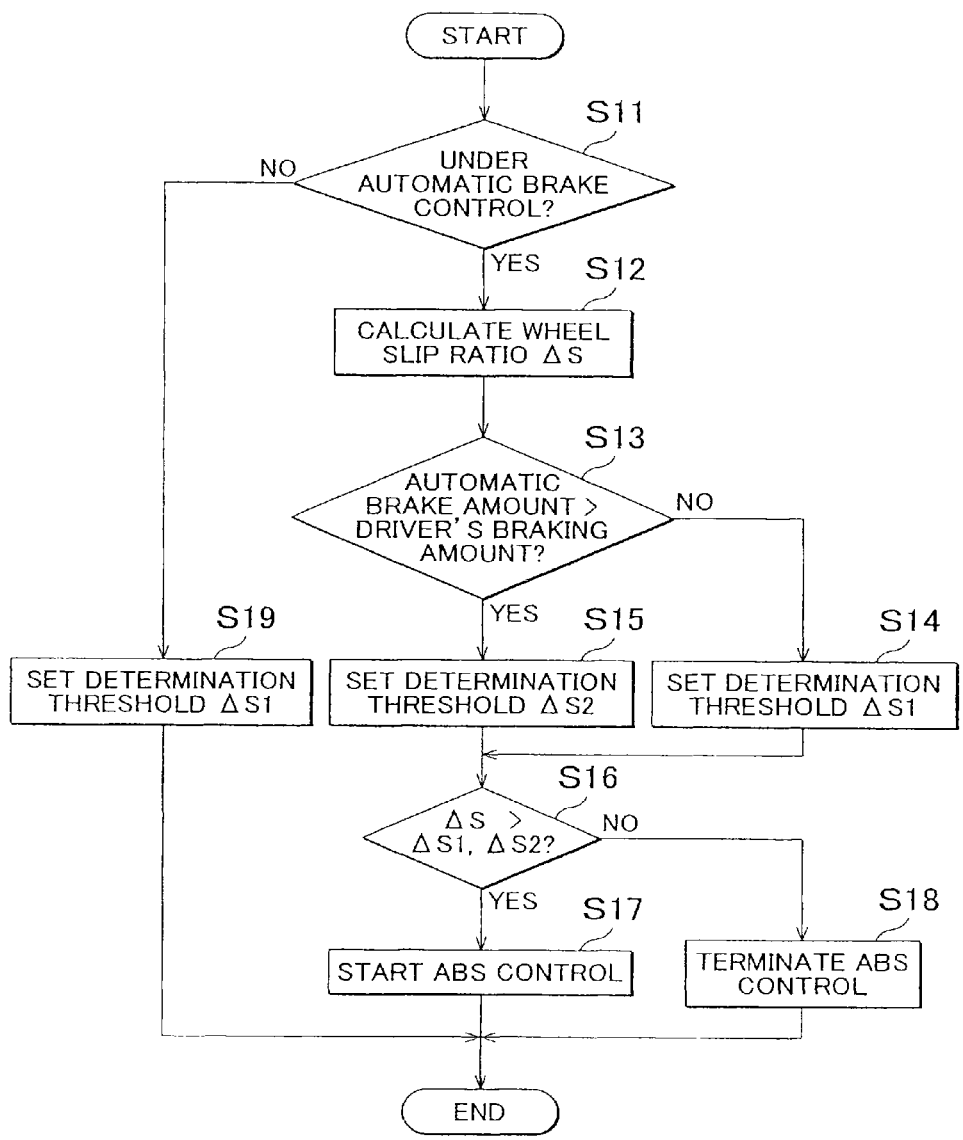
FIG. 2 is a flowchart showing brake control processing in the vehicle brake control apparatus according to the embodiment.
Figure 3:
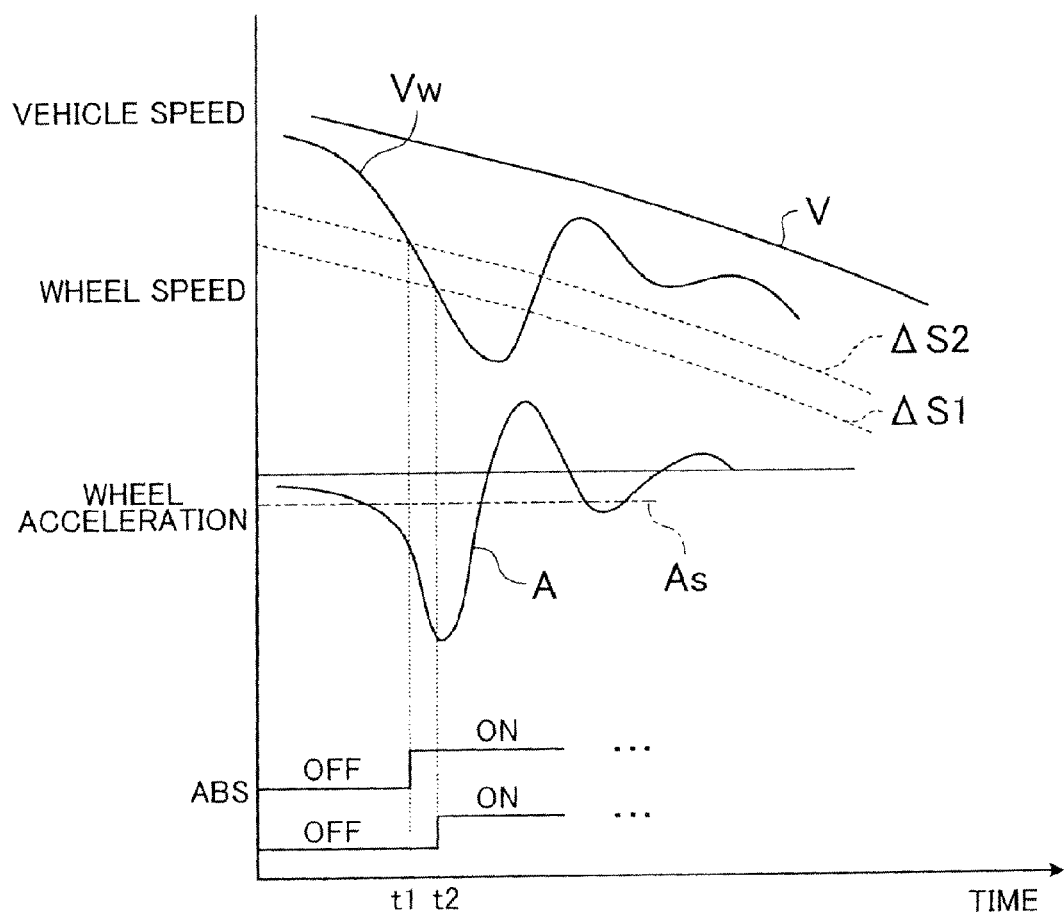
FIG. 3 is a time chart showing a running condition of a vehicle when it is braked with use of the vehicle brake control apparatus according to the embodiment.

FIG. 1 is a configuration diagram schematically showing a vehicle brake control apparatus according to an embodiment of the invention. FIG. 2 is a flowchart showing brake control processing in the vehicle brake control apparatus according to the embodiment. FIG. 3 is a time chart showing a running condition of a vehicle when it is braked with use of the vehicle brake control apparatus according to the embodiment.

A braking device controlled by the vehicle brake control apparatus of this embodiment is an electronically controlled braking device which is designed to electrically control a vehicle brake force, that is, a hydraulic pressure supplied to a wheel cylinder for generating brake force, in accordance with a brake-pedal depression amount (or brake-pedal operating force) input by means of a brake pedal. Specifically, this electronically controlled braking device can be exemplified by an electronically controlled brake (ECB) which controls the brake force by setting a target braking hydraulic pressure in accordance with a brake-pedal depression amount, adjusting the hydraulic pressure stored in an accumulator, and then supplying the adjusted hydraulic pressure to the wheel cylinder. However, a brake control system of a type configured such that master cylinder pressure generated by the driver's brake pedal operation is directly introduced in to the wheel cylinder can be employed as long as the wheel brake force can be controlled independently of the driver's brake pedal operation.

The vehicle brake control apparatus according to this embodiment has an automatic brake control device (first brake control apparatus) which operates the braking device based on information on surroundings of the vehicle, and an ABS (second brake control device) which operates the braking device such that slip of the wheels is suppressed.

The vehicle brake control apparatus according to the embodiment will be described. As shown in FIG. 1, a vehicle 11 has four drivable wheels FL, FR, RL, RR. The wheel FR represents a wheel located on the front right side as viewed from the driver's seat, the wheel FL represents a wheel located on the front left side, the wheel RR represents a wheel located on the rear right side, and the wheel RL represents a wheel located on the rear left side. This vehicle 11 has an internal combustion engine 12 that is a gasoline engine or a diesel engine, a transaxle 14 including a transmission 13 that is an automatic transmission or a continuously variable transmission, and a transfer (not shown).

The vehicle 11 of this embodiment is configured as a four-wheel-drive vehicle in which power is transferred from the internal combustion engine 12 to the front wheels FL, FR via the transfer, a front differential (not shown) and drive shafts 15L, 15R. An output shaft 16 of the transaxle 14 is connected to a rear differential 17. The rear wheels RL, RR are coupled to a rear differential 17 via drive shafts 18L, 18R. Thus, in the vehicle 11, power is transferred from the internal combustion engine 12 to the rear wheels RL, RR via the output shaft 16, the rear differential 17, and the drive shafts 18L, 18R.

The vehicle 11 of this embodiment is not limited to a four-wheel-drive vehicle, and may be a two-wheel-drive vehicle. Further, the vehicle 11 may be an electric-powered vehicle having an electric motor in place of an internal combustion engine, or a hybrid vehicle having both an internal combustion engine and an electric motor.

The vehicle 11 has a braking device 22 including disc brake units 21FR, 21FL, 21RR, 21RL provided in the respective wheels FR to RL. This braking device 22 is configured as an ABS with so-called electronic brake force distribution (EBD). Each of the disc brake units 21FR to 21RL has a brake disc 23 and a brake caliper 24. Each brake caliper 24 has a built-in wheel cylinder 25. The wheel cylinders 25 of the brake calipers 24 are connected to a brake hydraulic circuit 27 having a brake actuator, through independent hydraulic lines 26.

A brake pedal 28 is supported such that it can be depressed by a driver and is connected to a brake booster 29. A master cylinder 30 is fixed to this brake booster 29. The brake booster 29 is capable of generating assist power having a predetermined boost ratio in response to the driver'S depression of the brake pedal 28. The master cylinder 30 has a piston that is supported movably in the interior thereof, whereby two hydraulic chambers are defined in the master cylinder 30. A master cylinder pressure, that is obtained by combining the brake depression force and the assist power, can be generated in each of the hydraulic chambers. A reservoir tank 31 is provided above the master cylinder 30. The master cylinder 30 and the reservoir tank 31 communicate with each other when the brake pedal 28 is not depressed. However, when the brake pedal 28 is depressed, the communication is blocked, and the hydraulic chambers in the maker cylinder 30 are pressurized. The hydraulic chambers of the master cylinder 30 are connected to the brake hydraulic circuit 27 via respective hydraulic supply passages 32.

The brake hydraulic circuit 27 generates a brake hydraulic pressure according to the driver's depression amount of the brake pedal 28. The brake hydraulic circuit 27 supplies the brake hydraulic pressure to the wheel cylinders 25 through the hydraulic lines 26 to activate the wheel cylinders 25. The braking device 22 is thus enabled to apply a brake force to the wheels FR to RL so that the brake force acts on the vehicle 11.

The vehicle 11 is provided with an electronic control unit (ECU) 41. The ECU 41 is formed as a microcomputer having a central processing unit (CPU) as a main component. The ECU 41 has, in addition to the CPU, a read only memory (ROM) for storing a processing program, a random access memory (RAM) for temporarily storing data, an input/output (I/O) port, and a communication port. Therefore, the ECU 41 is able to control the internal combustion engine 12, the transmission 13, the brake hydraulic circuit 27 and so on.

The ECU 41 is connected to a brake stroke sensor 42 for detecting a depression amount (brake pedal stroke) of the brake pedal 28, and a master cylinder pressure sensor 43 for detecting a hydraulic pressure (master cylinder pressure) supplied from the master cylinder 30. Accordingly, the ECU 41 controls the brake hydraulic pressure generated by the brake hydraulic circuit 27 based on the detected brake pedal stroke and master cylinder pressure, and so on. In place of the brake stroke sensor 42, a brake pedal depressing force sensor may be used for detecting a depressing force of the brake pedal 28.

The ECU 41 has an ABS control device (second brake control device) 51 and an automatic brake control device (first brake control device) 52. The ABS control device 51 controls operation of the braking device 22 (brake hydraulic circuit 27) such that the slip ratio of the wheels FR to RL falls within a predetermined range. The ECU 41 (ABS control device 51) is connected to wheel speed sensors 44 and a vehicle speed sensor 45. The wheel speed sensors 44 are mounted in the respective wheels FR to RL to detect rotating speeds thereof, and transmit the detected rotating speeds of the wheels FR to RL (wheel speed) to the ECU 41. The vehicle speed sensor 45 detects a speed of the vehicle body and transmits the detected vehicle body speed (vehicle speed) to the ECU 41.

The ABS control device 51 calculates a slip ratio $\Delta S$ of the wheels FR to RL based on the wheel speed $V_w$ detected by the wheel speed sensors 44 and the vehicle speed V detected by the vehicle speed sensor 45. The ABS control device 51 controls the brake hydraulic pressure generated by the brake hydraulic circuit 27 based on the slip ratio $\Delta S$. For example, the ABS control device 51 calculates the slip ratio $\Delta S$ using the following formula.

$$\Delta S=[(V-V_W)/V]\times 100$$

Since the wheels FR to RL are provided with the wheel speed sensors 44, respectively, the wheel speed $V_W$ may be obtained by averaging four detection values obtained by the respective wheel speed sensors 44 and the wheel speed $V_W$ thus obtained may be used for calculation of the slip ratio ΔS. The calculation method of the slip ratio ΔS is not limited to the formula above. For example, the slip ratio ΔS may be determined by a difference between the vehicle speed V and the wheel speed $V_W$. The slip ratio ΔS may be determined by a difference between a detection value by an acceleration sensor and a differential value of the wheel speed $V_W$. The vehicle speed V may be estimated from an output of the internal combustion engine 12 or a transmission gear ratio of the transmission 13.

The ABS control device 51 has a threshold that is set for starting control of the brake hydraulic circuit 27 such that the slip ratio of the wheels FR to RL falls within a predetermined range. This means that the control of the brake hydraulic circuit 27 is started when the current slip ratio ΔS of the wheels FR to RL becomes greater than the preset threshold for the slip ratio.

The automatic brake control device 52 controls operation of the braking device 22 (brake hydraulic circuit 27) based on information on surroundings of the vehicle 11. The ECU 41 (automatic brake control device 52) is connected to a surroundings detection sensor 46 including of a camera or a radar device. The surroundings detection sensor 46 detects information on surroundings of the vehicle, for example, another vehicle or obstacle in front or behind the vehicle 11 when the vehicle 11 is running. The surroundings detection sensor 46 measures a distance to the detected vehicle or obstacle and transmits the measurement to the ECU 41.

The automatic brake control device 52 controls the brake hydraulic pressure generated by the brake hydraulic circuit 27 based on the distance to the vehicle or obstacle in front detected by the surroundings detection sensor 46. This means that the automatic brake control device 52 adjusts the brake hydraulic circuit 27, or the brake force so as to prevent the vehicle 11 from colliding against the vehicle or obstacle in front thereof. In this case, the automatic brake control device 52 outputs a brake force required by the brake hydraulic circuit 27, independently of the driver's depression amount of the brake pedal 28.

As described above, the ABS control device 51 starts controlling the brake hydraulic circuit 27 and adjust the brake force to the vehicle 11 when the slip ratio ΔS of the wheels FR to RL of the running vehicle 11 becomes greater than the threshold. The threshold of the slip ratio ΔS is applied when the brake force is intentionally caused to act on the vehicle 11 by the driver depressing the brake pedal 28. In addition, the ABS control device 51 adjusts the brake force by means of the brake hydraulic circuit 27 once the slip ratio ΔS of the wheels FR to RL of the running vehicle 11 becomes greater than the threshold even if the automatic brake control device 52 is controlling the brake hydraulic circuit 27 based on the information on surroundings of the vehicle 11. In this case, the automatic brake control device 52 causes the brake force to act on the vehicle 11 without the driver's intention.

Therefore, when the automatic brake control device 52 is controlling the brake hydraulic circuit 27, the control of the brake hydraulic circuit 27 by the ABS control device 51 must ensure more safety to the driver than when the automatic brake control device 52 is not controlling the brake hydraulic circuit 27.

In order to satisfy this requirement, the vehicle brake control apparatus according to this embodiment is provided with an activation threshold changing device (threshold changing device) which changes the threshold for activation of the ABS control device 51 such that the threshold when the automatic brake control device 52 is not active is smaller than the threshold when the automatic brake control device 52 is active. Specifically, the ECU 41 functions as this activation threshold changing device. This means that the ABS control device 51 is activated earlier when the automatic brake control device 52 is active than when the automatic brake control device 52 is not active.

In the vehicle brake control apparatus according to the embodiment, the ECU 41 (activation threshold changing device) decreasingly changes the threshold for activation of the ABS control device 51 when the braking amount of the braking device 22 (brake hydraulic circuit 27) determined by the automatic brake control device 52 is greater than the braking amount of the braking device 22 (brake hydraulic circuit 27) determined by the driver depressing the brake pedal 28 as a braking operation unit to be, operated by the driver.

In this case, the braking amount of the braking device 22 (brake hydraulic circuit 27) determined by the automatic brake control device 52 is a required brake force that is set by the ECU 41 based on the information on surroundings of the vehicle 11, that is, the detection result of the surroundings detection sensor 46. The braking amount of the braking device 22 (brake hydraulic circuit 27) determined by the driver depressing the brake pedal 28 is a required brake force that is set by the ECU 41 according to the depression amount of the brake pedal 28, that is, the detection result of the brake stroke sensor 42. These braking amounts are not limited particularly. The braking amount determined by the automatic brake control device 52 may be a brake force according to a detection result of the master cylinder pressure sensor 43, while the braking amount determined by the driver may be a brake force according to a detection result of the brake pedal depressing force sensor.

In the vehicle brake control apparatus according to this embodiment, the ABS control device 51 operates the braking device 22 (brake hydraulic circuit 27) so as to suppress the slip ratio particularly when the wheels FR to RL are locked. The ECU 41 suppresses the locking of the wheels FR to RL by changing the threshold for activation of the ABS control device 51 such that it is smaller when the automatic brake control device 52 is active than when the automatic brake control device 52 is not active. The ABS control device 51 is also capable of suppressing the slip of the wheels FR to RL by operating the braking device 22 (brake hydraulic circuit 27) to suppress the slip ratio from increasing when the wheels FR to RL slip during acceleration of the vehicle.

Specific processing of the brake control performed by the ECU 41 (the ABS control device 51 and the automatic brake control device 52) in the vehicle brake control apparatus of this embodiment will be described in detail with reference to the flowchart of FIG. 2.

In the vehicle brake control apparatus of the embodiment, as shown in FIG. 2, the ECU 41 determines, in step S11, whether or not the automatic brake control device 52 is controlling the braking device 22. If it is determined that the automatic brake control device 52 is not controlling the braking device 22 (No), then the ECU 41 exits from this routine after setting the determination threshold ΔS1 for determining activation of the ABS control device 51 in step S19. On the other hand, if the ECU 41 determines in step S11 that the automatic brake control device 52 is controlling the braking device 22 (Yes), the ECU 41 (ABS control device 51) calculates a slip ratio ΔS for the wheels FR to RL, in step S12, based on the wheel speed $V_W$ of the wheels. FR to RL detected by the wheel speed sensor 44 and the vehicle speed V detected by the vehicle speed sensor 45.

In step S13, the ECU 41 determines whether or not the braking amount of the braking device 22 determined by the automatic brake control device 52 is greater than the braking amount of the braking device 22 determined by the driver depressing the brake pedal 28. If it is determined that the braking amount of the braking device 22 by the automatic brake control device 52 is not greater than the braking amount of the braking device 22 determined by the driver depressing the brake pedal 28 (No), the ECU 41 then sets a determination threshold ΔS1 for determining activation of the ABS control device 51 in step S14. On the other hand, if it is determined that the braking amount of the braking device 22 determined by the automatic brake control device 52 is greater than the braking amount of the braking device 22 determined by the driver depressing the brake pedal 28 (Yes), the ECU 41 sets a determination threshold ΔS2 for determining activation of the ABS control device 51 in step S15.

The determination thresholds ΔS1, ΔS2 for determining activation of the ABS control device 51 are determination values for the slip ratio ΔS of the wheels FR to RL, and the determination threshold ΔS2 is smaller than the determination threshold ΔS1.

In step S16, the ECU 41 determines whether or not the current slip ratio ΔS of the wheels FR to RL is greater than the determination threshold ΔS1 or the determination threshold ΔS2. If it is determined that the current slip ratio ΔS of the wheels FR to RL is greater than the determination threshold ΔS1 or the determination threshold ΔS2 (Yes), the ABS control device 51 adjusts, in step S17, the braking amount of the braking device 22 (brake hydraulic circuit 27) so as to decrease the slip ratio ΔS of the wheels FR to RL. In contrast, if it is determined that slip ratio ΔS of the wheels FR to RL is equal to or less than the determination threshold ΔS1 or the determination threshold ΔS2 (No), the ABS control device 51 terminates, in step S18, the adjustment of the braking amount of the braking device 22 (brake hydraulic circuit 27).

When the ECU 41 compares the slip ratio ΔS of the wheels FR to RL with the determination threshold ΔS1 or the determination threshold ΔS2 in step S16, the ECU 41 simultaneously checks, with use of the ABS control device 51, whether the brake force of the wheels FR to RL can be controlled by the braking device 22, and whether the detection values obtained by the wheel speed sensor 50 and the vehicle speed sensor 45 are normal.

Accordingly, when the automatic brake control device 52 is controlling the braking device 22 and the braking amount of the braking device 22 determined by the automatic brake control device 52 is greater than the braking amount of the braking device 22 determined by the driver depressing the brake pedal 28, the ECU 41 changes the determination threshold of the slip ratio ΔS from the determination threshold ΔS1 to the determination threshold ΔS2. In other words, the ECU 41 reduces the determination threshold for the slip ratio ΔS. Therefore, when the braking amount determined by the braking device 22 is controlled by the automatic brake control device 52, the ABS control device 51 will start the slip control earlier than when it is not controlled by the automatic brake control device 52. This reduces the disturbance in behavior of the vehicle 11 and ensures safety driving for the driver.

Description will be made on operation to start activation of the ABS control device 51 by the vehicle brake control apparatus of this embodiment with reference to the time chart of FIG. 3.

In the operation to activate the ABS control device 51 by the vehicle brake control apparatus of this embodiment, as shown in FIG. 3, when the vehicle 11 is decelerated by the braking device 22 being activated by the automatic brake control device 52 or by the driver depressing the brake pedal 28, the vehicle speed V drops down while at the same time the wheel speeds $V_w$ of the wheels FR to RL also drop down. When in this state the wheels FR to RL are locked, the wheel speed $V_w$ of the wheels FR to RL is decreased significantly, resulting in increase of the slip ratio ΔS (to be described here as $V-V_w$).

Thus, the slip ratio ΔS ($V-V_w$) exceeds the determination threshold ΔS2 at time t1, and exceeds the determination threshold ΔS1 at time t2. Also, the wheel acceleration (differential value of the wheel speed $V_W$) A becomes lower than a wheel acceleration reference value $A_s$. Accordingly, since the determination threshold ΔS2 is set when the automatic brake control device 52 is controlling the braking device 22 and the braking amount of the braking device 22 determined by the automatic brake control device 52 is greater than the braking amount of the braking device 22 determined by the driver depressing the brake pedal 28, the slip ratio ΔS exceeds the determination threshold ΔS2 at time t1. At this time, the ABS control device 51 controls the braking device 22 and such brake control as to reduce the slip ratio ΔS of the wheels FR to RL is started. On the other hand, the determination threshold ΔS1 is set when the automatic brake control device 52 is not controlling the braking device 22, or even if the automatic brake control device 52 is controlling the braking device 22, the braking amount of the braking device 22 determined by the automatic brake control device 52 is not greater than the braking amount of the braking device 22 determined by the driver depressing the brake pedal 28. Therefore, the slip ratio ΔS exceeds the determination threshold ΔS1 at time t2 later than time t1. At this time, the ABS control device 51 controls the braking device 22 and such brake control as to reduce the slip ratio ΔS of the wheels FR to RL is started.

As described above, the vehicle brake control apparatus according to the embodiment has, as the ECU 41, the ABS control device 51 for controlling operation of the braking device 22 so as to suppress the slip of the wheels FR to RL, the automatic brake control device 52 for controlling operation of the braking device 22 based on information on surroundings of the vehicle 11, and the activation threshold changing device for changing the threshold for activation of the ABS control device 51 such that the threshold is smaller when the automatic brake control device 52 is active than when the automatic brake control device 52 is not active.

Accordingly, when the automatic brake control device 52 is controlling the braking device 22, the threshold for activation of the ABS control device 51, that is, the determination threshold of the slip ratio ΔS is changed to the smaller determination threshold ΔS2. This means that when the braking amount of the braking device 22 is controlled by the automatic brake control device 52, the ABS control device 51 starts its slip control earlier, which makes it possible to stabilize the behavior of the vehicle 11 even when the vehicle is braked without the driver's intention, and thus the safety in traveling of the vehicle 11 can be improved.

In this case, when the braking amount of the braking device 22 is controlled by the automatic brake control device 52, the ABS control device 51 starts operation earlier to activate the braking device 22 earlier so that increase in the slip ratio is suppressed particularly when the wheels FR to RL are locked, and locking of the wheels FR to RL can be suppressed.

In the vehicle brake control apparatus according to the embodiment, the ECU 41 changes the threshold for activation of the ABS control device 51 (the determination threshold of slip ratio $\Delta S$) to the smaller determination threshold $\Delta S2$ when the braking amount of the braking device 22 determined by the automatic brake control device 52 is greater than the braking amount of the braking device 22 determined by the driver depressing the braking operation. Therefore, when the braking amount of the braking device 22 is set by the automatic brake control device 52, the ABS control device 51 starts the slip control earlier, whereby the behavior of the vehicle 11 can be stabilized even when the vehicle is braked without the driver's intention.

Further, in the vehicle brake control apparatus according to the embodiment, the braking amount of the braking device 22 determined by the automatic brake control device 52 is a required brake force that is set based on a distance to another vehicle or an obstacle around the vehicle 11 detected by the surroundings detection sensor 46, whereas the braking amount of the braking device 22 determined by the driver's braking operation is a required brake force that is set based on a depression amount of the brake pedal 28. Accordingly, the automatic brake control device 52 sets a required brake force based on a distance to another vehicle or an obstacle around the vehicle 11 detected by the surroundings detection sensor 46, and the ABS control device 51 starts the slip control earlier when this required brake force is greater than a required brake force that is set based on a depression amount of the brake pedal 28, which makes it possible to stabilize the behavior of the vehicle 11 with a simple configuration, even when the vehicle is braked without the driver's intention.

Although the description of the embodiment above has been made on the assumption that the ECU 41 is formed of the ABS control device (second brake control device) 51 and the automatic brake control device (first brake control device) 52, the ABS control device 51 and the automatic brake control device 52 are not limited to those described above, and any other conventional device may be used.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A vehicle brake control apparatus comprising:
   a first brake control device that operates a braking device based on information on surroundings of the vehicle;
   a second brake control device that operates the braking device when a slip ratio of wheels becomes greater than a threshold;
   a determination device that determines whether a braking amount of the braking device determined by the first brake control device is greater than a braking amount of the braking device determined by an operation of a braking operation unit that is operated by a driver to brake the vehicle, the operation of the braking operation unit occurring while the braking device is being operated by the first brake control device; and
   a threshold changing device that, when the determination device determines that the braking amount of the braking device determined by the first brake control device is greater than the braking amount of the braking device determined by the operation of the braking operation unit that is operated by the driver to brake the vehicle, changes the threshold, at which the braking device is activated by the second brake control device, so that the threshold when the braking device is being operated by the first brake control device is smaller than the threshold when the braking device is not being operated by the first brake control device.

2. The brake control apparatus according to claim 1, wherein the braking amount of the braking device determined by the first brake control device is a brake force that is set based on the information on surroundings of the vehicle, and the braking amount of the braking device determined by the braking operation unit is an operation amount or operating force of a brake pedal as the braking operation unit.

3. The brake control apparatus according to claim 1, wherein:
   the second brake control device operates the braking device so as to suppress an increase of the slip ratio when the wheels are locked; and
   the threshold changing device suppresses the locking of the wheels by changing the threshold at which the braking device is activated by the second brake control device, so that the threshold when the braking device is being operated by the first brake control device is smaller than the threshold when the braking device is not being operated by the first brake control device.

4. A vehicle brake control method comprising:
   determining an operation state of a braking device based on information on surroundings of the vehicle;
   determining which one of a first braking amount of the braking device and a second braking amount of the braking device is greater than the other, depending on the operation state, wherein the first braking amount is determined based on the information on surroundings of the vehicle, the second braking amount is determined by a braking operation of a driver depressing a braking operation unit at a time of the determining;
   setting a threshold for a slip ratio of wheels at which the braking device is activated to a first threshold value when the first braking amount is not greater than the second braking amount; and
   setting the threshold to a second threshold value that is smaller than the first threshold when the first braking amount is greater than the second braking amount.

* * * * *